US008442498B2

(12) United States Patent
Yin et al.

(10) Patent No.: US 8,442,498 B2
(45) Date of Patent: May 14, 2013

(54) METHODS, SYSTEMS AND COMPUTER PROGRAM PRODUCTS FOR REMOTE DVR INTERFACE PROVISIONING

(75) Inventors: Fenglin Yin, Lexington, MA (US); Diego Sebastian Rozensztejn, Brookline, MA (US); Abhishek Gupta, Addison, TX (US); Okeno Palmer, Woburn, MA (US); Guillermo Ortiz, Brookline, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1180 days.

(21) Appl. No.: 12/339,240

(22) Filed: Dec. 19, 2008

(65) Prior Publication Data

US 2010/0162294 A1    Jun. 24, 2010

(51) Int. Cl.
*H04N 7/16* (2011.01)
(52) U.S. Cl.
USPC .................................. 455/414.1; 455/456.1
(58) Field of Classification Search ............... 455/412.1, 455/414.1, 418, 456.1
See application file for complete search history.

(56) References Cited

U.S. PATENT DOCUMENTS

2006/0059107 A1* 3/2006 Elmore et al. ............. 705/64

* cited by examiner

*Primary Examiner* — Sam Bhattacharya

(57) ABSTRACT

This disclosure details the implementation of methods, systems and computer program products for remote digital video recorder (DVR) interface provisioning (hereinafter, "DIP"). DIP systems allow for authentication, validation, and registration of users and/or user devices as well as management of identifiers associated with those users and devices. Through interaction with DIP systems, users may associate different devices with each other and/or with one or more underlying service systems and/or accounts to allow integrated use of multiple devices in association with those services. In one implementation, DIP systems may be employed to register one or more mobile and/or remote devices (e.g., mobile phones) with DVR systems to allow for remote manipulation of video recording schedules, content management, parental control management, and/or the like DVR features. In one embodiment, a method is disclosed, comprising: providing a provisioning interface for display to a user, the provisioning interface including an interface element configured to receive a mobile device identifier; receiving a mobile device identifier input to the provisioning interface; receiving a local media receiver device identifier; querying a service account based on the local media receiver device identifier; retrieving a service account activation code based on the query; and storing the mobile device identifier in association with the activation code in a database.

20 Claims, 5 Drawing Sheets

METHODS, SYSTEMS AND COMPUTER PROGRAM PRODUCTS FOR REMOTE DVR INTERFACE PROVISIONING

BACKGROUND

Systems have come about to facilitate the registration and management of user identities and/or user devices for particular applications. For example, when an individual purchases a mobile telephone device, a unique identifier associated with the device may be provided to a remote server and stored in association with a user identifier associated with the individual before the mobile phone is activated for use. Once associated with the user, the mobile phone may be configured with the user's personal telephone number and/or other settings selected by and/or associated with the user. An existing mobile subscriber may subsequently register for additional services and/or features, such as GPRS, MMS, Instant Messaging, and/or the like for his or her mobile phone by indicating an interest in such features and initiating one or more service engagement processes.

Figure 1:
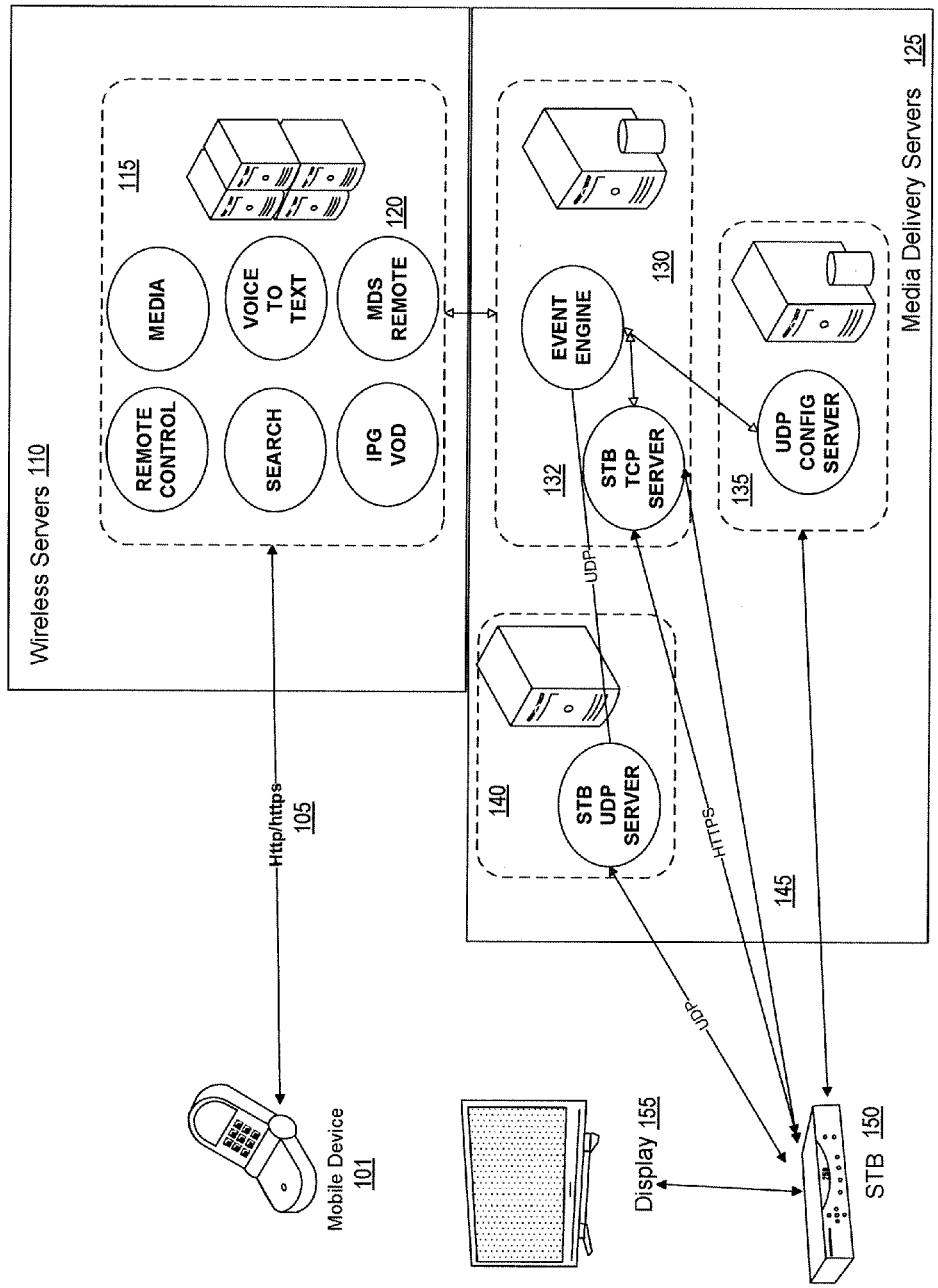
FIG. 1 shows an implementation of data flow between and among system components and associated entities in one embodiment of DIP operation.

The leading number of each reference number within the drawings indicates the figure in which that reference number is introduced and/or detailed. As such a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for remote digital video recorder (DVR) interface provisioning (hereinafter, "DIP"). DIP systems allow for authentication, validation, and registration of users and/or user devices as well as management of identifiers associated with those users and devices. Through interaction with DIP systems, users may associate different devices with each other and/or with one or more underlying service systems and/or accounts to allow integrated use of multiple devices in association with those services. In one implementation, DIP systems may be employed to register one or more mobile and/or remote devices (e.g., mobile phones) with DVR systems to allow for remote manipulation of video recording schedules, content management, parental control management, and/or the like DVR features.

In one embodiment, a method is disclosed, comprising: providing a provisioning interface for display to a user, the provisioning interface including an interface element configured to receive a mobile device identifier; receiving a mobile device identifier input to the provisioning interface; receiving a local media receiver device identifier; querying a service account based on the local media receiver device identifier; retrieving a service account activation code based on the query; and storing the mobile device identifier in association with the activation code in a database.

In one embodiment, a set-top box (STB) may be linked with a user's service account and a personal activation code (PAC) generated for the STB when a user first purchases or otherwise registers association with a service, such as a DVR service, and/or the like. The PAC may act as a unique identifier to the STB and may be configured to support mobile remote DVR services. Associated with each cellular telephone, which may act as the mobile device for mobile remote DVR services, there is a Mobile Identification Number (MIN) which may be identical to one's Mobile Device Number (MDN). Such numbers may serve as unique mobile device identifiers for mobile devices working in conjunction with mobile remote DVR services. In one implementation, MIN (or MDN) and PAC may serve as the primary pair of device identifiers for DIP system services such as provisioning and registration. In another implementation, an MDN and PAC may serve respectively as a login and password for authentication purposes.

Provisioning procedures may be undertaken in a variety of different manners within various embodiments and implementations of DIP operation. In one implementation, provisioning may take place by means of a television-based application and interactions with a television (TV) interface. The TV application may prompt a user to enter an MDN, after which a PAC may be presented to the user on the TV screen. The user may then enter the PAC one the user's mobile device (e.g., cell phone) to complete the provisioning process. In one implementation, the PAC/MDN pair may be saved to the cell phone in a secured way for future authentication use.

In another implementation, provisioning may take place by means of backend server short-message service (SMS) text messages. After an STB is registered, a PAC may be sent to the user's mobile device via an SMS text message, and may be stored thereon by an on-board mobile remote DVR application for later access and/or use. In various implementations, the SMS message may be sent from a DIP system server, by a DIP system administrator or agent, may be triggered by a web interface page from the user himself, and/or the like. The MDN/PAC pair may then be sent to the DIP system server for activation which, when successful, may be securely saved on the user's mobile device in a tamper-proof way via digital signing. When a DIP application is launched thereafter, the encrypted MDN and PAC pair may be sent to the server for authentication. In one implementation, no user interaction is required for this authentication.

In still another implementation, an activated mobile device may send the SMS text message to the new mobile device for activation. The original activated device may then serve as a primary device and one or more new devices may serve as secondary devices for interaction and/or use in conjunction with mobile remote DVR application features and/or functionality.

It is to be understood that, depending on the particular needs and/or characteristics of an DIP user, administrator, DVR and/or mobile device system, media server, wireless server, data payload, monetization model, hardware configuration, network framework, and/or the like, various embodiments of the DIP may be implemented that enable a great deal of flexibility and customization. The instant disclosure discusses embodiments of the DIP primarily within the context of associating one or more mobile devices (e.g., mobile telephones) with a DVR system, associated STB devices, and/or the like. However, it is to be understood that the system described herein may be readily configured/customized for a wide range of other applications or implementations. For example, aspects of DIP systems may be adapted for coupling multiple STBs to each other, registering one or more local control devices, configuring remote devices to couple to one or more computer systems, and/or the like applications. It is to be understood that DIP systems may be further adapted to other implementations and/or provisioning applications.

FIG. 1 shows an implementation of data flow among and between system components and affiliated entities in one embodiment of DIP operation. In one embodiment, a mobile device may 101 may be connected to wireless servers 110 via a communications network implementing any of a variety of communications protocols, such as but not limited to hypertext transfer protocols (http) 105. A display (e.g., a television) 155 and/or a local media receiver device (e.g., STB) 150, on the other hand, may be coupled to one or more media delivery servers (MDSs) 125 via communications networks implementing any of a variety of different communications protocols, such as but not limited to http, user datagram protocol (UDP), and/or the like 145. In one implementation, media delivery servers may comprise Verizon Fiber Optic System (FiOS) servers. Via coupling between the wireless servers 110 and the media delivery servers 125, the mobile device 101 may ultimately connect to and/or communicate with the STB 150, display 155, and/or the like.

Wireless servers 110 may contain subsystems and/or functional modules 115 configured to implement a wide variety of functions, services and/or features associated with embodiments of DIP operation. In the illustrated implementation, these modules may include remote control services, an interactive program guide (IPG) and video-on-demand (VOD) services, media services, text-based search services, voice search services, MDS remote systems 120, and/or the like. In one implementation, a remote control service may be configured to control service interfaces with a DVR system and provide other functionality, such as but not limited to: management of scheduling to record TV programs, viewing/deleting of recorded programs or in-progress recording, parental control management, channel favorites and VOD bookmarks, user authentication and user profile management, application provisioning, and/or the like. IPG and VOD services may be configured to provide functionality, such as but not limited to: browsing television program guides based on channel and time; filtering television programs based on high-definition (HD) channels, program ratings, program types, user favorites, profiles, and/or the like; and browsing VOD contents based on folder names, hierarchical position of folders, and/or the like. Media services may be configured to process images, preview video clips, logos, and/or the like associated with TV and VOD programs and/or channel content, as well as transcoding of videos for different mobile device platforms. Text based search services may provide character and key word based searching capability for users to search TV programs and VOD content texts. Voice search services may employ a speech recognition engine to translate audio commands into text and, in one implementation, prompt users to choose text for searching content. In one implementation, the speech recognition engine may use grammars built from TV program and VOD content texts.

An MDS remote system component 120 may serve as an intermediary liaison between wireless server 110 components and MDS 125 components. For example, messages 145 communicated between the MDS 125 and the STB 150 may, in one implementation, comprise encrypted binary data structures. An MDS remote system 120, then, may serve to translate those encrypted binary data structures into one or more formats and/or protocols suitable for delivery to wireless server 110 components and/or mobile devices 101 and may, in one implementation, present a Simple Object Access Protocol (SOAP) for communicating with the STB.

The MDS 125 may also include a variety of components and/or subsystems configured to implement various features, services, and/or functionality. An Event Engine 130 may receive all STB requests posted, for example, from wireless servers 110 and relay those requests to the STB through UDP or TCP servers, depending, for example, on the type of broadband home router. An STB TCP server 132 may be employed for configuring messages from the Event Engine 130 to the STB as TCP messages. Similarly, an STB UDP sever 140 may configure requests forwarded by the Event Engine 130 as UDP messages when UDP is supported by the broadband home router. The UDP server 140 may send requests to the STB using one or more STB network configurations by calling a UDP configuration server 135, which acts as a repository for STB UDP network configurations, including router wide area network (WAN) internet protocol (IP) address, port forwarding port, encryption key, and/or the like.

Figure 2:
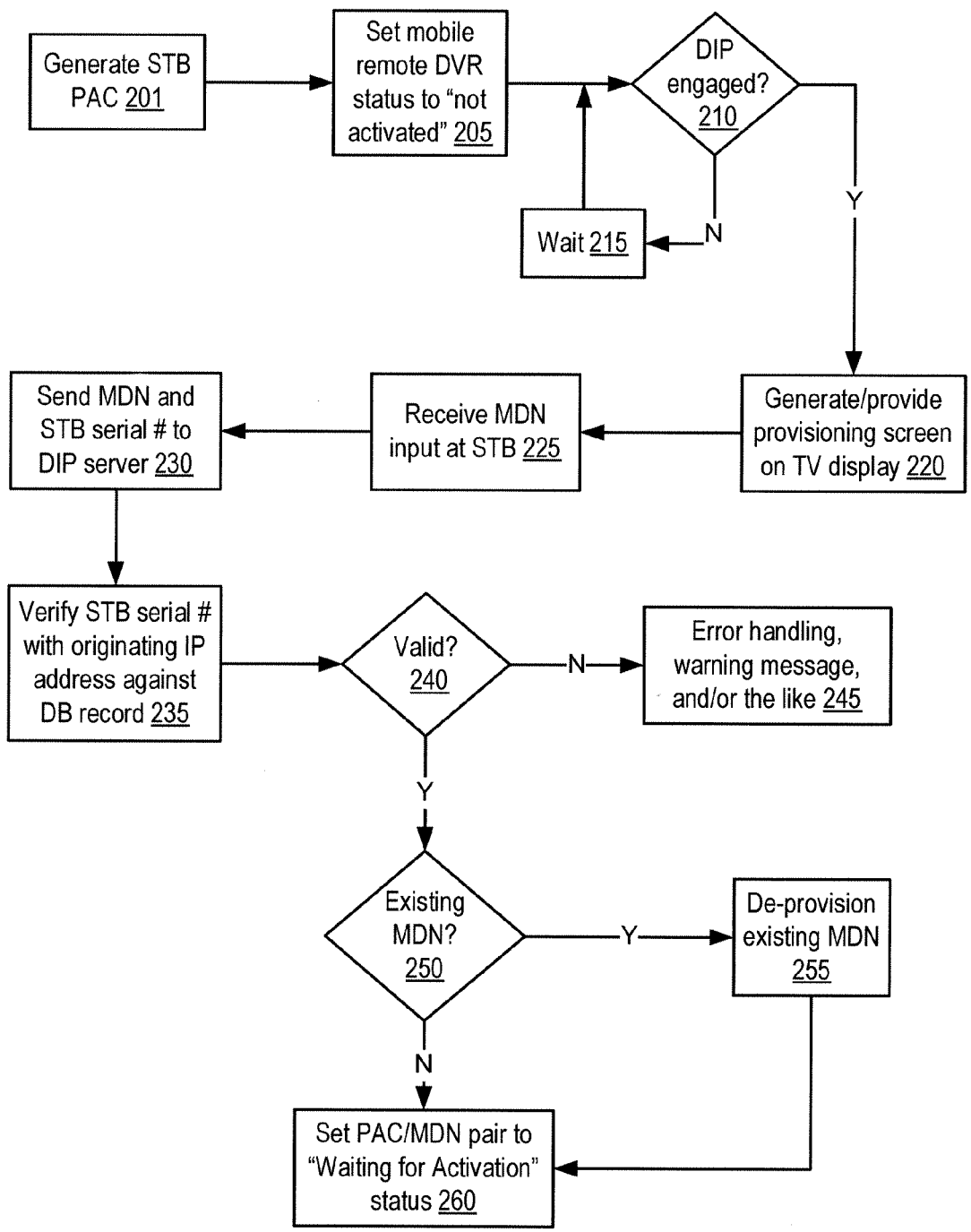
FIG. 2 shows an implementation of logic flow for television interface based provisioning in one embodiment of DIP operation.

FIG. 2 shows an implementation of logic flow for television interface based provisioning in one embodiment of DIP operation. When a user, customer, and/or the like first acquires a recording service (e.g., a FiOS TV digital video recording service), a local media receiver device, such as a set-top box (STB) in one implementation, may be provided to the user and/or linked with a service account stored in association with the user and/or a user identifier. In one implementation, the STB may be configured to support mobile and/or remote DVR capabilities (e.g., FiOS TV mobile remote DVR). A DIP system may then generate a PAC for association with the STB 201. In one implementation, a DIP system may maintain a "Not Activated" status for mobile remote DVR services for a particular user and/or service account prior to successful completion of provisioning and/or activation 205. A determination may then be made as to whether a user has engaged the DIP system and/or particular provisioning functionalities associated therewith 210. In one implementation, a user may engage DIP system features via a menu interface provided on a television (TV) screen. If the user has not engaged the provisioning features, the DIP system will continue to wait 215. Otherwise, the DIP system will generate and/or provide a provisioning screen on the TV screen for display to the user and/or to facilitate provisioning 220. The provisioning screen may, in one implementation, include interface elements configured to receive input of a mobile device identifier, MIN, MDN, and/or the like. In one implementation, an MDN may comprise a telephone number, international mobile subscriber identity, and/or the like. The MDN is received at the STB 225 and sent, along with an STB identifier (e.g., an STB serial number), to the DIP system server 230.

In one implementation, the DIP system may attempt to validate or verify the information received at 235. For example, in one implementation, the DIP system may compare the received serial number along with a communications address (e.g., internet protocol (IP) address) from which the number was received with stored values maintained in a database, such as may be associated with the service account, a user identifier, and/or the like 235. Based on such a comparison, the DIP system may determine if the information is valid 240. If not, then an error handling procedure may be undertaken, which may, in various implementations, include providing warning messages to the originating user and/or to a DIP system administrator, ignoring the request, providing a message to the user to re-enter the information, and/or the like 245. If the determination at 240 finds that the information submitted is valid, then, in one implementation, the DIP system may check whether there is already an existing MDN associated with the user and/or with an associated service account 250. If so, then the DIP system may de-provision the existing MDN. In one implementation, de-provisioning the existing MDN may comprise deleting the existing MDN and/or otherwise removing the MDN from DIP storage. The DIP system may then assign a status of "Waiting for Activation" to the PAC and MDN numbers, storing the status in association with the user identifier and/or service account in a database.

Figure 3:
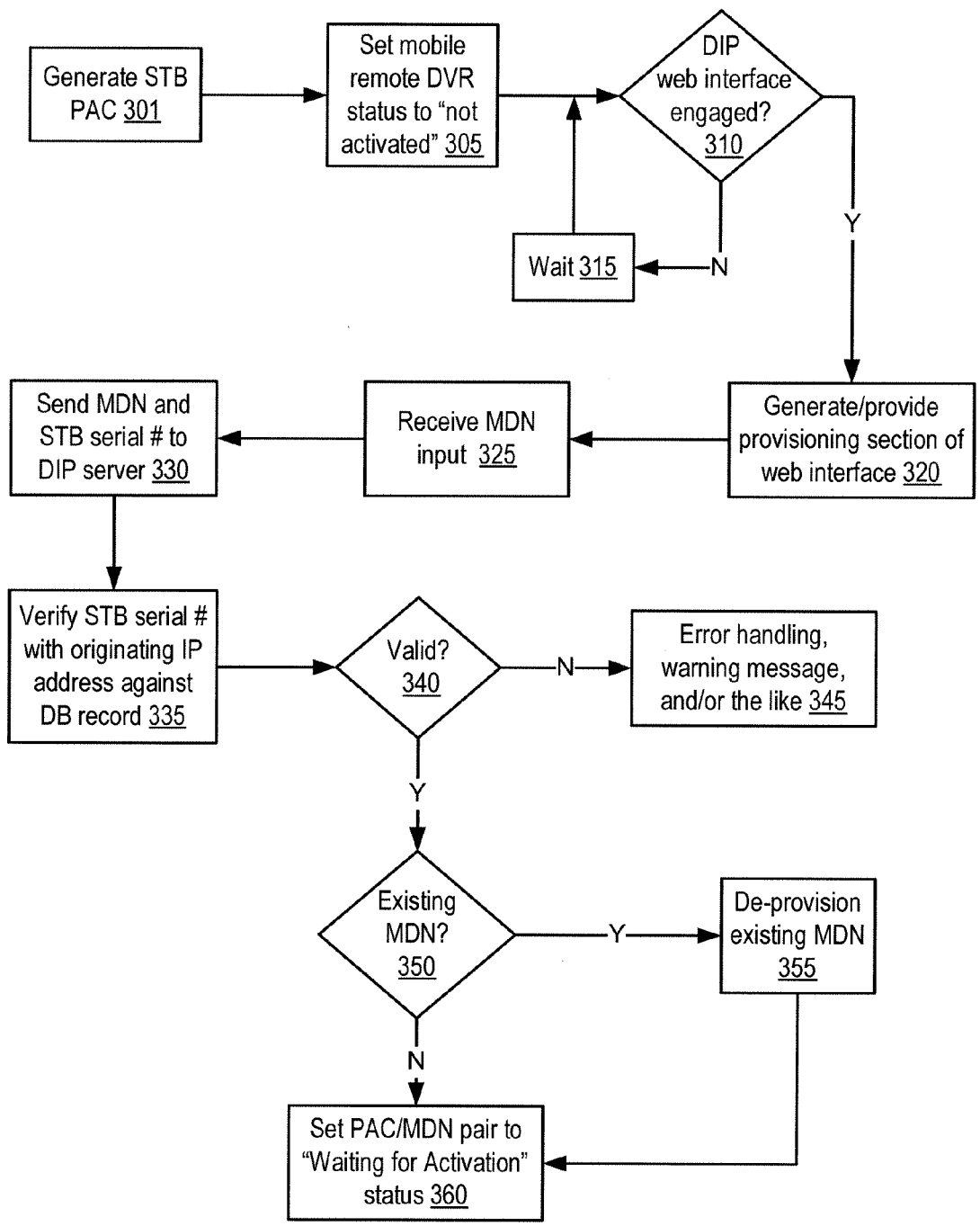
FIG. 3 shows an implementation of logic flow for web interface based provisioning in one embodiment of DIP operation.

FIG. 3 shows an implementation of logic flow for web interface based provisioning in one embodiment of DIP operation. Web interface based provisioning may, in one implementation, share similarities with television interface provisioning except in aspects of interface display and device identifier inputs. A DIP system may generate a PAC for association with a newly acquired STB and/or an STB that is newly associated with a new service account 301. In one implementation, a DIP system may maintain a "Not Activated" status for mobile remote DVR services for a particular user and/or service account prior to successful completion of provisioning and/or activation 305. A determination may then be made as to whether a user has engaged a DIP web interface and/or particular provisioning functionalities associated therewith, such as by accessing a website providing the web interface 310. If the user has not engaged the provisioning features, the DIP system will continue to wait 315. Otherwise, the DIP system will generate and/or provide a provisioning webpage for display to the user and/or to facilitate provisioning 320. The provisioning webpage may, in one implementation, include interface elements configured to receive input of a mobile device identifier, MIN, MDN, and/or the like. The MDN input is received via the web interface 325 and sent, along with an STB identifier (e.g., an STB serial number), to the DIP system server 330.

In one implementation, the DIP system may attempt to validate or verify the information received at 335. For example, in one implementation, the DIP system may compare the received serial number along with a communications address (e.g., internet protocol (IP) address) from which the number was received with stored values maintained in a database, such as may be associated with the service account, a user identifier, and/or the like 335. Based on such a comparison, the DIP system may determine if the information is valid 340. If not, then an error handling procedure may be undertaken, which may, in various implementations, include providing warning messages to the originating user and/or to a DIP system administrator, ignoring the request, providing a message to the user to re-enter the information, and/or the like 345. If the determination at 340 finds that the information submitted is valid, then, in one implementation, the DIP system may check whether there is already an existing MDN associated with the user and/or with an associated service account 350. If so, then the DIP system may de-provision the existing MDN. The DIP system may then assign a status of "Waiting for Activation" to the PAC and MDN numbers, storing the status in association with the user identifier and/or service account in a database.

Figure 4:
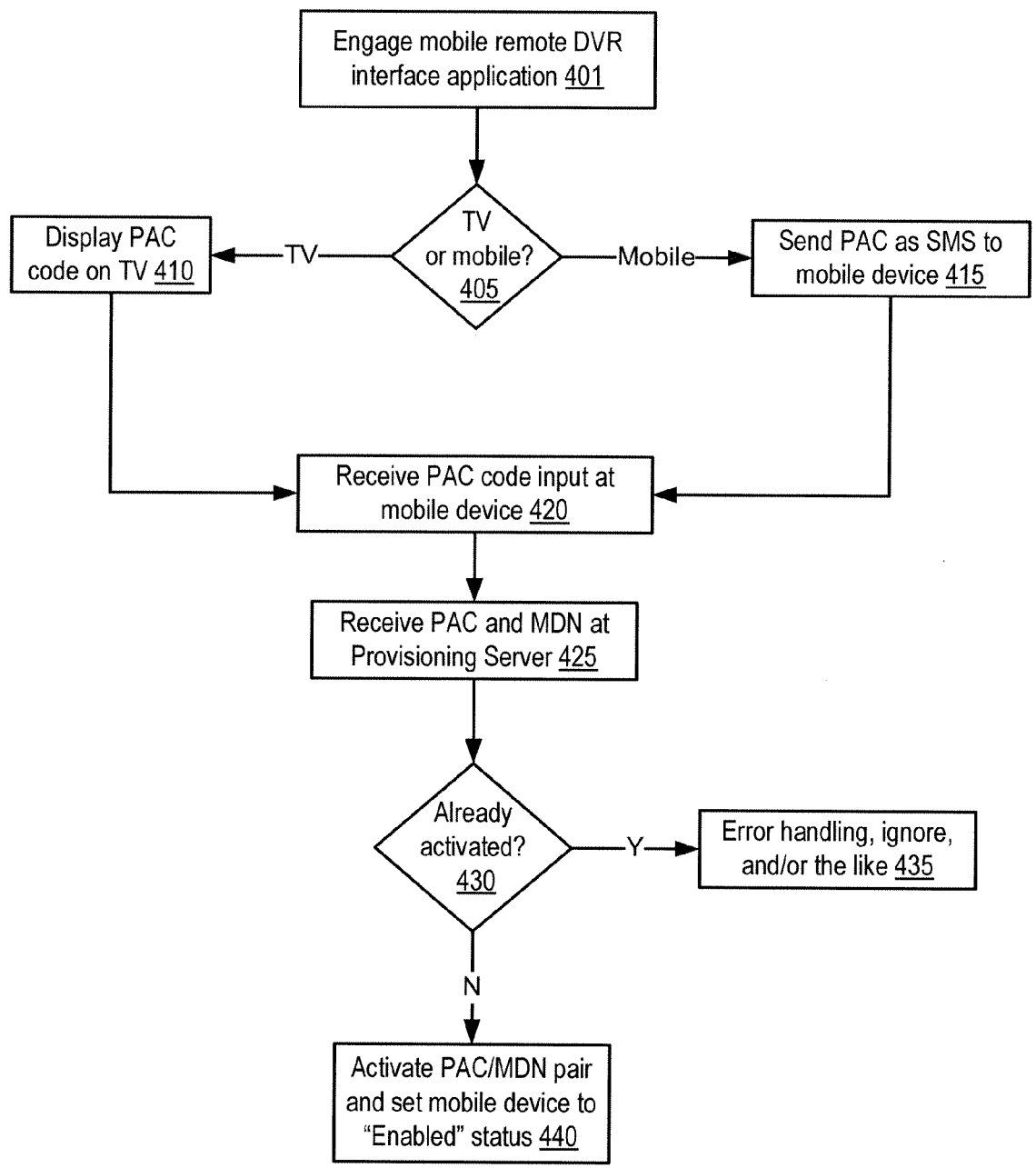
FIG. 4 shows an implementation of logic flow for remote DVR device activation in one embodiment of DIP operation.

FIG. 4 shows an implementation of logic flow for remote DVR device activation in one embodiment of DIP operation. In one implementation, a mobile device having an MDN that, in association with a PAC, is set to a "Waiting for Activation" status may be unable to implement mobile remote DVR services until the device is fully activated. A user may engage the mobile remote DVR interface application 401 to effect activation. The mobile remote DVR interface application may, for example, comprise software installed on a mobile device such as a cellular telephone, blackberry, personal digital assistant (PDA), iPhone, and/or the like. A determination may be made as to whether the PAC code associated with a user's service account should be displayed to the user via a television interface or a mobile device interface 405. In one implementation, such a determination may be made by providing an inquiry to the user's mobile device as to which device he or she wishes to receive the PAC number on. In another implementation, the determination may be made based on a query sent to the user's local media receiver device, STB, and/or the like to determine whether the device is engaged, whether the television display is on, and/or the like. If the TV is the selected device at 405, then the DIP system may provide the PAC code for display on the TV monitor 410, such as by sending the code via a communications network to the STB. If the mobile device is the selected device at 405, then the PAC code may be provided for display on the mobile device 415, such as via an SMS text message, and/or the like. The user, having received the PAC code, may enter the PAC code for submission to the DIP system via the a mobile remote DVR interface 420, such as may be provided on the user's mobile device. The PAC code and an MDN associated with the mobile device may then be provided to a DIP system server, provisioning server, and/or the like 425. A determination may then be made as to whether the MDN, in association with the PAC number, has already been activated 430. If so, any of a variety of different error handling procedures may be undertaken in various implementations, such as providing a message to the user indicating that the number and/or an associated device has already been activated, ignoring the request, and/or the like 435. Otherwise, the PAC/MDN pair may be activated and the mobile device status set to "Enabled" in association with the service account, user identifier, mobile device identifier, and/or the like 440. In one implementation, an "Enabled" status may authorize an associated mobile device to act as a controlling device within a mobile remote DVR system and/or to control an STB or other local media receiver device, such as via signals relayed via wireless servers in communication with media delivery servers.

In one implementation, the SMS text message sent to the user's mobile device at 415 may be sent from a DIP system server, be sent by a DIP system administrator and/or agent, and/or the like.

In another implementation, the SMS text message sent to the user's mobile device at 415 may be sent from a primary mobile device that has already been activated for the user. By sending an SMS text message from the activated primary mobile device to an un-activated secondary mobile device, the user may begin the process of registering the secondary mobile device for activation as a usable device for mobile remote DVR features and/or functionality. In one implementation, de-provisioning of the primary mobile device results in de-provisioning of all associated secondary mobile devices as well.

In one implementation, an XML, for signing in to mobile remote DVR services and acquiring a user profile may take a form similar to the following example:

```
<?xml version="1.0"?>
<brewPage>
    <opname>login</opname>
    <id>7814664235</id>
```

```
            <pac>3425</pac>
            <model>LGVX8500</model>
            <version>0.4.000</version>
        </brewPage>
``` where inputs may include a login, an ID (e.g., a 10 digit mobile phone number), a PAC (e.g., the PAC associated with the user's STB), an STB model identifier (e.g., to assist in retrieving version and/or update information), an application version, and/or the like.

In one implementation, an XML for a DIP system response for the sign-in request shown above may take a form similar to the following example:

```
<?xml version="1.0" encoding="utf-8" ?>
<brewPage>
    <profile status="Activated" regionId="91121" vn="0.1" update="False"
    vhoId="VHOGTW" timeOffset="360" />
</brewPage>
``` where a status may reflect the status of activating a mobile device to manage the STB and/or implement mobile remote DVR functionality, a regionID may indicate a region associated with video service, a vhoID may correspond to a video headend office, vn may reflect an on-deck version number of the application, an update may reflect the status of mandatory updates, a timeoffset may indicate the standard time offset relative to coordinated universal time, and/or the like.

Dip Controller

Figure 5:
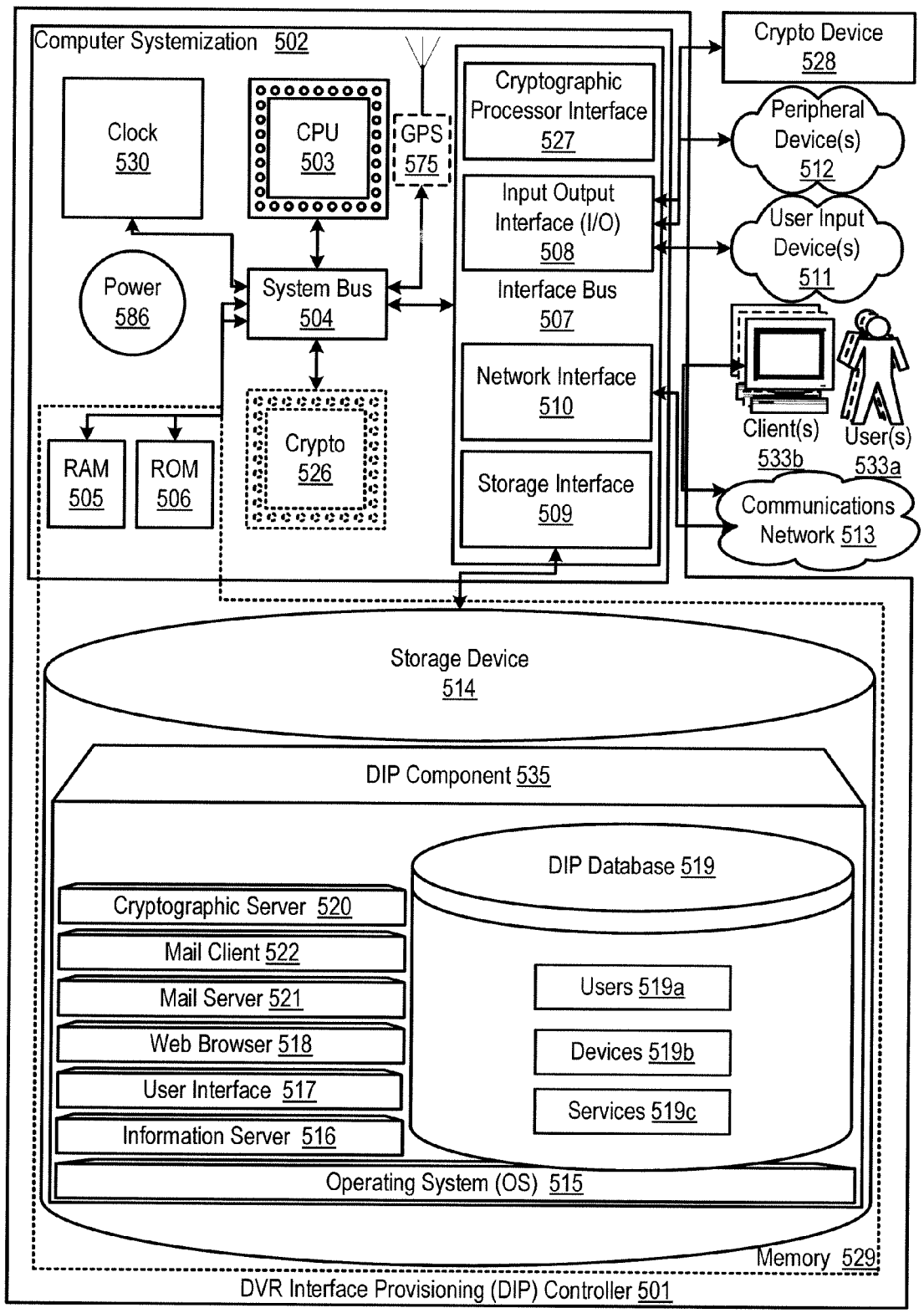
FIG. 5 is of a block diagram illustrating exemplary embodiments of a Manager controller.

FIG. 5 of the present disclosure illustrates inventive aspects of a DIP controller 501 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the DIP controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DIP controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, the foregoing are all interconnected and/or communicating through a system bus 504. Optionally, the computer systemization may be connected to an internal power source 586. Optionally, a cryptographic processor 526 and/or a global positioning system (GPS) component 575 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the DIP controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the DIP thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(es) 507 may accept, connect, and/or communicate to a number of interface adapters, conventionally although not necessarily in the form of adapter cards, such as, but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the DIP controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the DIP controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the DIP controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource; thus, any number of memory embodiments may be employed in lieu of or in concert with one another. It is to be understood that the DIP controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the DIP component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the DIP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DIP controller to communicate with other entities through a communications network 513. Various communication protocols may be used by the DIP controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DIP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DIP database 519, operating systems, other program components, user interfaces, Web browsers, and/or the like.

Access to the DIP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DIP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DIP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the DIP enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DIP.

Access to the DIP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DIP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DIP component to engage in secure transactions if so desired. The cryptographic component facilitates the secure accessing of resources on the DIP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DIP Database

The DIP database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DIP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the DIP database is implemented as a data-structure, the use of the DIP database 519 may be integrated into another component such as the DIP component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-c. A Users table 519a may include fields such as, but not limited to: user_ID, user_name, contact_info, hardware_ID(s), local_media_receiver_ID, local_media_receiver_type, display_ID, display_type, mobile_device_ID, mobile_device_type, service_account, usage_history, device_ID, service_ID, access and/or authorizations, and/or the like. A Devices table 519b may include fields such as, but not limited to: device_ID, device_type, device_name, data_formatting requirements, protocols, addressing_info, usage_history, device_requirements, user_ID, authorizations, service_ID, and/or the like. A Services table 519b may include fields such as, but not limited to: service_ID, access_level, available_feature(s), provisioning_requirement(s), and/or the like. These tables may support and/or track multiple entity accounts on the DIP controller.

In one embodiment, the DIP database may interact with other database systems. For example, employing a distributed database system, queries and data access by search DIP component may treat the combination of the DIP database, an integrated data security layer database as a single database entity.

In one embodiment, user programs may contain various user interface primitives, which may serve to update the DIP. Also, various accounts may require custom database tables depending upon the environments and the types of clients the DIP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-c. The DIP may be configured to keep track of various settings, inputs, and parameters via database controllers.

The DIP database may communicate to and/or with other components in a component collection, including itself, and/or facilities of the like. Most frequently, the DIP database communicates with the DIP component, other program components, and/or the like. The database may contain, retain, and provide information regarding other nodes and data.

The DIP Component

The DIP component 535 is a stored program component that is executed by a CPU. In one embodiment, the DIP component incorporates any and/or all combinations of the aspects of the DIP that was discussed in the previous figures. As such, the DIP affects accessing, obtaining and the provision of information, services, transactions, and/or the like across various communications networks.

The DIP component is configurable to access, calculate, engage, exchange, generate, identify, instruct, match, process, search, serve, store, and/or facilitate user and/or device provisioning, identity management, service activation, access, authorization, and/or the like and use of the DIP.

The DIP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL, commands, web application server extensions, WebObjects, and/or the like. In one embodiment, the DIP server employs a cryptographic server to encrypt and decrypt communications. The DIP component may communicate to and/or with other components in a component collection, including itself, and/or facilities of the like. Most frequently, the DIP component communicates with the DIP database, operating systems, other program components, and/or the like. The DIP may contain, communicate, generate, obtain, and/or provide program component, system, user, and/or data communications, requests, and/or responses.

Distributed DIPs

The structure and/or operation of any of the DIP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DIP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:
providing a provisioning interface for display to a user, the provisioning interface including an interface element configured to receive a mobile device identifier;
receiving a mobile device identifier input to the provisioning interface;
receiving a local media receiver device identifier;
querying a service account based on the local media receiver device identifier;
retrieving a service account activation code based on the query; and
storing the mobile device identifier in association with the activation code in a database.

2. The method of claim 1, wherein the local media receiver device identifier is sent from a local media receiver device.

3. The method of claim 1, further comprising:
identifying a communications address from which the local media receiver device identifier is received;
comparing the communications address with at least one corresponding address stored in association with the service account; and
wherein the querying, retrieving and storing are only performed if the communications address matches the at least one corresponding address.

4. The method of claim 3, wherein the communications address comprises an internet protocol address.

5. The method of claim 1, further comprising:
determining if a first mobile device identifier has already been stored in association with the activation code; and
if a first mobile device identifier has been stored, assigning a decommissioned status to the first mobile device identifier.

6. The method of claim 5, wherein assigning a decommissioned status to the first mobile device identifier comprises deleting the first mobile device identifier.

7. The method of claim 1, wherein the provisioning interface is configured as a web page.

8. The method of claim 1, wherein the provisioning interface is configured as a television service screen.

9. The method of claim 1, wherein the mobile device identifier comprises an international mobile subscriber identity.

10. The method of claim 1, wherein the local media receiver device comprises a set-top box.

11. The method of claim 1, wherein the local media receiver device identifier comprises a device serial number.

12. The method of claim 1, further comprising:
assigning an Awaiting Activation status to the mobile device identifier and the activation code stored as a pair.

13. The method of claim 12, further comprising:
providing the activation code for display to the user;
requesting the user to enter the activation code into an activation interface;
receiving the user-entered activation code and the mobile device identifier;
assigning an Activated status to the mobile device identifier and the activation code stored as a pair.

14. The method of claim 13, wherein the activation code is provided for display to the user on a television service screen.

15. The method of claim 13, wherein the activation code is provided to a mobile device associated with the mobile device identifier as an SMS text message.

16. The method of claim 13, further comprising:
assigning an Enabled status to a mobile device associated with the mobile device identifier.

17. The method of claim 16, wherein the Enabled status serves as an authorization for a mobile device corresponding to the mobile device identifier to control a local media receiver device corresponding to the local media receiver device identifier.

18. The method of claim 16, wherein a primary mobile device associated with the mobile device identifier sends the activation code to a secondary mobile device via an SMS text message, and further comprising:
providing a second provisioning interface for display to the user;
receiving a second mobile device identifier associated with a second mobile device via the second provisioning interface;
receiving the local media receiver device identifier;
querying the service account based on the local media receiver device identifier;
retrieving the service account activation code and the mobile device identifier based on the query; and
storing the second mobile device identifier in association with the activation code and the mobile device identifier in a database.

19. A system, comprising:
a processor;
a memory in communication with the processor and containing program instructions;
an input and output in communication with the processor and memory comprising a graphical interface;
wherein the processor executes program instructions contained in the memory and the program instructions comprise:
provide a provisioning interface for display to a user, the provisioning interface including an interface element configured to receive a mobile device identifier;
receive a mobile device identifier input to the provisioning interface;
receive a local media receiver device identifier;
query a service account based on the local media receiver device identifier;
retrieve a service account activation code based on the query; and
store the mobile device identifier in association with the activation code in a database.

20. A computer program product, comprising:
processor readable instructions stored in the computer program product, wherein the processor readable instructions are issuable by a processor to:
provide a provisioning interface for display to a user, the provisioning interface including an interface element configured to receive a mobile device identifier;
receive a mobile device identifier input to the provisioning interface;
receive a local media receiver device identifier;
query a service account based on the local media receiver device identifier;
retrieve a service account activation code based on the query; and
store the mobile device identifier in association with the activation code in a database.

* * * * *